(12) United States Patent
Van Der Hoeff et al.

(10) Patent No.: US 10,415,828 B2
(45) Date of Patent: Sep. 17, 2019

(54) REFRACTORY TUBE WALL LINING FOR AN INCINERATOR

(71) Applicant: HKH Development B.V., Limmen (NL)

(72) Inventors: Joseph Adrianus Maria Van Der Hoeff, Limmen (NL); John Koenders, Gouda (NL)

(73) Assignee: HKH Development B.V., Limmen (NL)

( * ) Notice: Subject to any disclaimer, the term of this patent is extended or adjusted under 35 U.S.C. 154(b) by 348 days.

(21) Appl. No.: 15/314,866

(22) PCT Filed: Jun. 4, 2015

(86) PCT No.: PCT/NL2015/000019
§ 371 (c)(1),
(2) Date: Nov. 29, 2016

(87) PCT Pub. No.: WO2015/187007
PCT Pub. Date: Dec. 10, 2015

(65) Prior Publication Data
US 2017/0191658 A1    Jul. 6, 2017

(30) Foreign Application Priority Data

Jun. 6, 2014 (NL) .................................... 1040836
Aug. 29, 2014 (NL) .................................... 1040929
Feb. 16, 2015 (NL) .................................... 1041195

(51) Int. Cl.
F23M 5/08      (2006.01)
F23M 5/04      (2006.01)
(Continued)

(52) U.S. Cl.
CPC ................ F23M 5/08 (2013.01); F23M 5/04 (2013.01); F27D 1/12 (2013.01); F27D 1/14 (2013.01);
(Continued)

(58) Field of Classification Search
CPC .. F23M 5/08; F23M 5/04; F23M 2900/05002; F27D 1/14; F27D 1/12; F16B 5/0028
See application file for complete search history.

(56) References Cited

U.S. PATENT DOCUMENTS 3,657,399 A    4/1972   Brichard
4,045,168 A    8/1977   Abriel
(Continued)

FOREIGN PATENT DOCUMENTS

DE    20316213 U1    3/2005
DE    102008033219 A1    1/2010
(Continued)

*Primary Examiner* — David J Laux
(74) *Attorney, Agent, or Firm* — Gable Gotwals

(57) ABSTRACT

This invention relates to a refractory lining of a tube wall (2) for an incinerator including at least four refractory tiles (3) of ceramic material which are arranged next to and above one another, wherein the tiles at their rear side, which is facing the tube wall (2), are provided with a vertical insertion channel (10) for mounting the tiles upon the holders (7) of the tube wall, wherein a free space (11) is formed between the tiles (3) and the tube wall (2), which space is filled with a curable pouring compound, and wherein a spacer (20) is provided adjacent to four mutually adjoining edges (12) of the at least four refractory tiles (3). Alternative embodiments are characterized by the use of a head bolt, and/or wedge element (50) and/or a flip-element (60).

21 Claims, 11 Drawing Sheets

(51) Int. Cl.
*F27D 1/12* (2006.01)
*F27D 1/14* (2006.01)
*F16B 5/00* (2006.01)

(52) U.S. Cl.
CPC .. *F16B 5/0028* (2013.01); *F23M 2900/05002* (2013.01)

(56) References Cited

U.S. PATENT DOCUMENTS

| | | | |
|---|---|---|---|
| 4,703,603 | A | 11/1987 | Hills |
| 4,809,645 | A | 3/1989 | Fournier et al. |
| 8,104,287 | B2 * | 1/2012 | Fischer .................... F23M 5/04 60/752 |
| 2002/0077767 | A1 | 6/2002 | Terashima et al. |
| 2007/0271867 | A1 * | 11/2007 | Taber .................... F22B 37/108 52/506.03 |
| 2011/0139049 | A1 * | 6/2011 | Kern .................... F22B 37/108 110/336 |

FOREIGN PATENT DOCUMENTS

| | | |
|---|---|---|
| EP | 0214538 A1 | 3/1987 |
| EP | 1032790 B1 | 8/2001 |
| EP | 1443269 A1 | 8/2004 |
| EP | 1788308 A2 | 5/2007 |
| EP | 1867924 A1 | 12/2007 |
| EP | 2261561 A2 | 12/2010 |
| EP | 2388521 A2 | 11/2011 |
| JP | 200222150 A | 1/2002 |
| JP | 2003161417 A | 6/2003 |
| WO | 2007142632 A1 | 12/2007 |
| WO | 2014060451 A2 | 4/2014 |

* cited by examiner

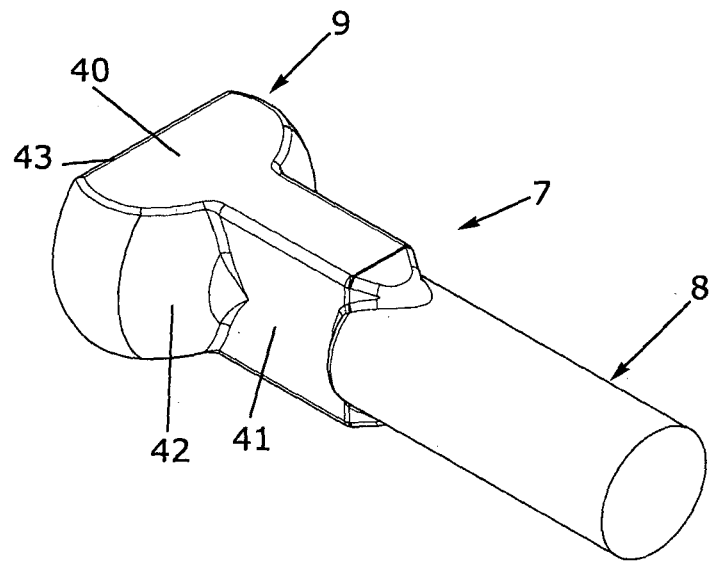
Fig.5A
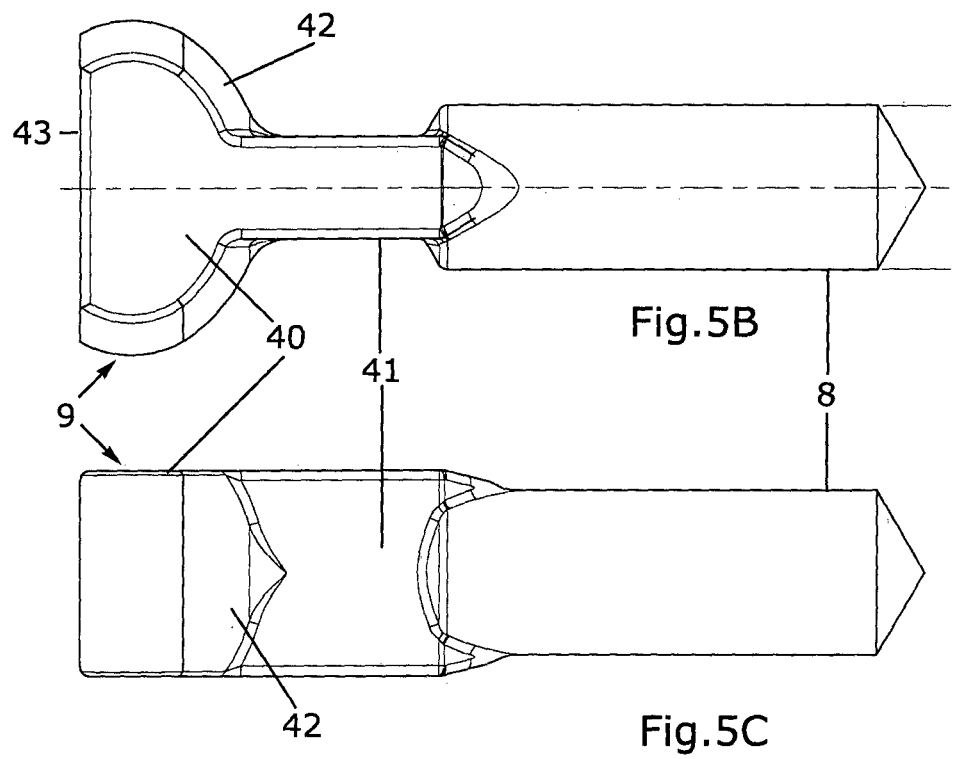
Fig.5B
Fig.5C

REFRACTORY TUBE WALL LINING FOR AN INCINERATOR

CROSS-REFERENCE TO RELATED APPLICATIONS

This application is the United States National Phase of PCT Application No. PCT/NL2015/000019 filed 4 Jun. 2015, which claims priority to Netherlands Patent Application No. 1041195 filed 16 Feb. 2015, Netherlands Patent Application 1040929 filed 29 Aug. 2014, Netherlands Patent Application No. 1040836 filed 6 Jun. 2014 each of which is incorporated herein by reference.

The present invention relates to a refractory tube wall lining for an incinerator comprising:
at least four refractory tiles of ceramic material, which are arranged in two rows next to and above one another, wherein the tiles with their tube wall-side, which is facing towards the tube wall, are provided with a vertical insertion channel, and wherein an edge of each of the four tiles adjoins an edge of each of the three other tiles;
a holder for each tile, wherein the tile holder is provided with an anchor that is attached to the tube wall, and wherein in the mounted position of the lining, the tile holder extends substantially perpendicular to the tube wall and partially extends into the insertion channel,
and wherein a free space is formed between the tiles and the tube wall.

The refractory lining according to the invention is designed to be applied on tube walls, also known as membrane walls, of a furnace of a (waste) incinerator, in order to prevent corrosion of the metal parts by the flue gases, and in order to allow high furnace temperatures without causing weakening or cracking of the metal tubes owing to local high temperatures.

The tube wall is formed by tubes, which are in vertical closely adjacent but spaced apart parallel aligned relationship. The tubes are welded together by means of fins or connecting strips/dams so that a closed gas-tight furnace is obtained. In use, water and/or steam flows through the tubes of the furnace, taking in the released combustion heat. Such linings are known from EP 2388521 and EP 1032790. The purpose of the lining is to extend the service life of the incinerator and to reduce failure and (expensive) repair of the tube wall.

In current incineration plants, the tube walls and the liners are often exposed to temperatures of over 1000° C., and undergo expansion and contraction in the tube wall and the lining, due to the considerable differences in temperature.

The lining is formed by a wall of shaped bodies of a ceramic material, hereinafter referred to as tiles. The tiles are arranged next to and above one another in order to form a protective lining wall for the tube wall. At their tube wall-side, the tiles are provided with a vertical insertion channel enabling the tiles to be slidingly moved or pushed onto the tile holders and to be retained on the tube wall. The holders are provided with an anchor, wherein the end of the anchor is welded onto a connection strip between the tubes. Preferably, stud welding or bolt welding is chosen for the welding process to be applied. In mounted position, the anchor extends substantially perpendicular to the surface of the tube wall. Usually, the anchor is formed as a threaded bolt onto which a nut is provided serving as a head.

Preferably, joint material is disposed between the tiles such as a ribbon or strip of felt. The felt is preferably adhered (glued) onto the tiles, for example by using a quick-drying spray adhesive (glue). The purpose of the felt is to space apart the tiles from each other at some distance in order to compensate for reversible and non-reversible expansion of the tiles during operation at high furnace temperatures. As a result, the risk is reduced of cracking of the tiles due to expansion and contraction during operation. When one or more horizontal rows of tiles are piled up and hung against the tube wall, the free space between the tiles and the tube wall (also referred to as rear pouring joint) is filled with a curable pouring (liquid) compound such as a concrete mortar, for example. The felt ensures that the mortar does not flow into the joints between the tiles, as otherwise easily cracking of the tiles will occur due to thermal expansion. When the poured compound is cured, the lining is ready to protect the tube wall against the high temperatures and the flue gases during operation of the incinerator.

The abovementioned well-known refractory lining and the building up and mounting of the tiles have a number of disadvantages.

The horizontal and vertical alignment of the tiles is time-consuming because for each holder the nut must be screwed by rotation onto the anchor, and the nut must be adjusted to the desired position of the tile. During operation of the furnace, in order to obtain a good heat transmission through the lining to the tube wall, the thickness of the cured poured compound should be as small as possible and consequently also the free space between the tiles and the tube wall should be as thin as possible. However, when this free space is too thin, the pouring compound will not be able to flow out well and consequently zones are formed in the free space having little or no pouring compound, so that locally the tiles are not well supported, and additionally hot combustion gases are able to come into direct contact with the tube wall through the joints between the tiles. Therefore during the assembly of the lining, it is essential that the thickness of the free space can be set optimally, accurately and uniformly within close limits, so that a smooth and homogeneous cured poured layer of the desired thickness is obtained.

Furthermore during constructing the known lining, it is very time-consuming to properly align the tiles horizontally and vertically, because providing the free space between the tiles and the tube wall with a predetermined optimum value is difficult, concurrent with providing the mutual joint distance (add height and joint width) between the tiles with a predetermined optimum value.

Disadvantageously during pouring of the concrete mortar into the free space between the tiles and the tube wall of the known lining, there is a great risk on pressing out of the joint material from the joints between the tiles, due to the hydrostatic pressure of the mortar. Consequently, the known lining has the disadvantage that a maximum of two rows of tiles can be built up and subsequently be provided with concrete mortar, owing to the great risk of ejecting the joint material at the bottom row of tiles when simultaneously filling the free space behind three or more rows of tiles. Additionally, the risk of cracking of the tiles during operation is greatly increased, as a result of flowing in of mortar into the tile joints. At worst, it is even possible that the tiles themselves are pressed from the anchoring, due to the hydrostatic pressure while simultaneously pouring mortar behind three or more rows of tiles.

It is therefore an the object of the invention to provide a refractory lining of a tube wall for an incinerator, which can be built up, complemented and repaired more easily and rapidly, which can accurately be aligned at a predetermined joint distance, and which is provided with a homogeneous cured poured compound having an optimal thickness, and which will provide little chance for damaging to occur to the lining and the tube wall.

According to the invention, these objects are achieved by providing a (liner/tile) spacer adjacent to the four mutually adjoining edges of the at least four refractory tiles.

By mounting the (liner/tile) spacers adjacent to the adjoining (thickness) edges—of four adjacent corners—of four tiles, the tiles are both horizontally and vertically aligned having an optimum mutual joint distance. In addition, the spacer prevents that the joint material (felt) is pushed out from the horizontal and vertical joints between the tiles by the pouring compound, and prevents occurrence of mutual shifts between the tiles due to the hydrostatic pressure caused by filling of the rear pouring joint. Applying the spacers according to the invention enables building up three or more rows of tiles, and simultaneously filling up the free space with concrete mortar between the three or more rows of tiles and the tube wall. Preferably, the spacer is so-called lost material, as it is burned up at low temperatures during start-up and warming up of the furnace.

Preferably the tile spacer supports at least one face which contains an adjoining edge of one of the four tiles; in particular, one spacer is provided adjacent to the four mutually adjoining edges of the at least four refractory tiles, and wherein the spacer supports two faces of the two next to one another arranged tiles, and wherein the supported face of each supported tile comprises the edge, which adjoins an edge of each of the other three tiles.

In order to obtain a proper alignment of the tiles having optimal mutual (joint) distances with respect to each other and optimal distances to the tube wall, the spacers are provided adjacent to the corners of the tiles. For each set of two vertically superposed tiles one or more spacers are provided. By providing each spacer above the vertical joint between the two horizontally side by side arranged tiles in a first row, each spacer also supports two adjacent tiles on a second row, provided on top of the first row, so that the four tiles are optimally aligned and fixed with respect to each other and to the tube wall.

Preferably, two faces of each tile are provided with a strip of felt, in particular, the upper side face and the right or left side face of the tile are provided with a felt strip. When a row of tiles of the lining is built up from left to the right, advantageously before mounting the tile, a strip of felt is provided on the right-hand side face. The horizontal strip of felt is provided after mounting of the tiles onto the holders, in order to prevent damaging of the felt during assembly.

Preferably, the spacer has an I-shape with flanges at both ends of the body. It is easy to mount this spacer on a refractory tile—provided with joint materials (felt strip)— and it also provides a good horizontal and vertical alignment of the adjacent and superposed refractory tiles.

Preferably, the flanges of the tile spacer extend over the furnace fireside and over the tube wall-side of two superposed tiles; in particular, the flanges of the spacer extend over the furnace fireside and over the tube wall-side of the four refractory tiles, which are arranged next to and above one another; more in particular, the spacer is provided with fireside flanges for the furnace fireside of the tile, and with tube-side flanges for the tube wall-side of the tile, in which the tube-side flanges extend substantially planar and at right angles with respect to the body.

Due to the flanges of the I-shaped tile spacer extending over the furnace fireside (side of the tile which is directed towards the interior of the incinerator) and over the tube wall-side (side of the tile which is directed towards the tube wall), the tiles are accurately aligned with respect to each other. By providing the tube-side flanges (flanges which are located at the tube wall-side of the tile) at right angles and with a flat planar shape, the pouring mortar can easily flow along and over the spacers, and during operation expanding and displacing of the tiles is improved with respect to the cured (concrete) mortar. Furthermore advantageously, when applying tile spacers, the tiles form a flat wall, thereby providing a more evenly distributed load of the tiles on the holders, so that displacement of the tiles on the holders is reduced.

Preferably, at least a fireside flange (flange which is located on the furnace fireside of the tile) of the tile spacer is provided with a clamping rim. In particular, the clamping rim is formed by an inwardly bent or curved part of the fireside flange in the direction of the tube-side flange. By including clamping rims on the fireside flange, the spacer can be clamped onto the tiles, so that the spacer is unable to displace easily or to come loose and fall down, throughout mounting new rows of tiles during building up the lining of the tube wall in the incinerator. In addition, the spacer secures the tiles and the strips of felt against ejection due to the hydrostatic pressure of the concrete mortar.

In particular, the outer end of the fireside flange is provided with an outwardly bent or curved portion. Due to this measure the tiles are easily inserted from above into the spacer, during assembly of the lining, and compensation for variations in the dimensions of the tiles is achieved.

Preferably, the body of the spacer at one side is provided with at least one rib, which extends parallel to the flanges. More in particular, two or more parallel ribs are provided on the body of the spacer. By providing these ribs, the required and desired joint height between the tiles is obtained in a simple manner, and furthermore is prevented that the horizontal joint material (felt strip) is shifting or being displaced between the tiles.

Preferably, the spacer is partly made of a material that disappears, burns or evaporates during operation of the incinerator, preferably for the material is chosen from a plastic or synthetic resin; more preferably, the material is provided with glass fibre reinforcement.

Therefore, the spacer is a mounting tool and as a result may be manufactured at low cost, for example, from a plastic material. By including glass fibre into the material of the spacer, the strength thereof is increased, and a less large void is formed after the start-up and warming-up of the incinerator, because the glass fibre is not burnt and remains present in the lining.

The refractory lining of a tube wall for a combustion furnace according to the invention may be provided with a one-piece holder, such as a head bolt, for example. In particular, for the features of the head bolt one or more is selected from: a head with flattened sides; a head with rounded undersides; a narrowed neck section between the head and the anchor; a smooth-surface anchor; the area of the cross-section of the anchor is substantially equal to the area of the cross-section of the neck section. The rounded circular shape of the underside of the head provides a larger contact area with the insertion channel of the tile compared to the known planar nuts, thereby preventing notching due to the (hydrostatic) load inducing line/point contact with the inner side of the insertion channel during the assembly, or due to deformation of the tiles during operation.

The narrowed neck section provides for easy mounting of the tiles, because more freedom is available in the horizontal direction during mounting of the tiles.

A smooth-surfaced anchor has a 40% higher strength than a threaded rod of the same diameter; in addition, a smooth anchor is better resistant to chemical attack due to the smaller specific surface area. By maintaining the area of the cross-sections of the neck section and the anchor substantially equal, a bolt is obtained, on which a tile can be easily positioned, but which does not contain weakened portions or sections.

In a special embodiment the refractory lining is provided with a wedge element in the insertion channel of the refractory tiles adjoining the tile holder, wherein the wedge element is arranged to enable optimal positioning of the tiles onto the holder.

In particular, the wedge element comprises a channel body, provided with a wedge portion and a slot body.

By inserting the tapered wedge portion of the wedge element into the space between the topside of the holder and the inside of the insertion channel, the (rounded) undersides of the holder are pressed against the rounded inside of the insertion channel, so that the tiles are optimally positioned at the desired and required distance from the tube wall. Additionally, the wedge element according to the invention is always in the correct manner inserted into the insertion channel (except when it is inserted upside down).

In a special embodiment, for the purpose of repairing or supplementing or expanding an existing refractory lining, an insertion hole is provided in a refractory tile and a clip-element is provided in the insertion hole of the tile, and wherein the tile with the clip-element is snapped onto the holder.

In particular, the clip-element is a V-shaped snap-element, which comprises two clip-wings, which at their base side are mutually interconnected, and which at their upper sides are provided with a support-tab, and with a hook-tab.

Preferably, the two clip-wings of the clip-element are provided with openings adapted for receiving and clamping of insertion portions of the holder.

In particular, the openings in the clip-wings of the clip-element are provided with engagement means, such as teeth.

The repair tile is of great advantage when a new portion of the lining must fit into the existing lining, or when a tile of the refractory lining must be replaced. By applying a clip-element provided with the advantageous features of the invention into an insertion hole of a tile, the tile can simply be snapped onto a (displaced) tile holder without the need for slidingly moving, as a result of which the tile is optimally positioned onto the holder in line with the neighbouring tiles. The tiles may be provided pre-fabricated with an insertion hole, but the insertion hole may also be provided later, for example by drilling. Usually when the tile(s) is mounted onto an existing tile holder(s), one (or more) new customized insertion hole is provided in the insertion channel of the tile.

The invention also relates to a method of assembling and building up the refractory tube wall lining for an incinerator comprising the steps of:
attaching a plurality of tile holders on the connecting strips between the tubes of the tube wall;
mounting of a plurality of refractory tiles next to one another in a first horizontal row with their vertical insertion channels onto the tile holders;
providing tile spacers adjacent to two mutually adjoining side edges of two next to another refractory tiles in the first row;
mounting of a second horizontal row of tiles on the first horizontal row of tiles, such that the tile spacer is positioned adjacent to the four mutually adjoining edges of the four refractory tiles.

More particularly, the method also comprises the step of: inserting a wedge element into the space between the topside of the holder and the inside of the insertion channel.

The invention also relates to a tile spacer for use in the refractory lining of a tube wall for an incinerator.

The invention also relates to a head bolt for use in the refractory lining of a tube wall for an incinerator.

The invention also relates to a wedge element for use in the refractory lining of a tube wall for an incinerator.

The invention also relates to a clip-element for use in the refractory lining of a tube wall for an incinerator.

By means of a drawing of the refractory lining comprising examples of the embodiments of the spacer and the head bolt, hereinafter the invention will be further explained in more detail, whereby features and other advantages will come forward.

FIG. 5A shows in an isometric view the head bolt according to the invention;

Figure 6:
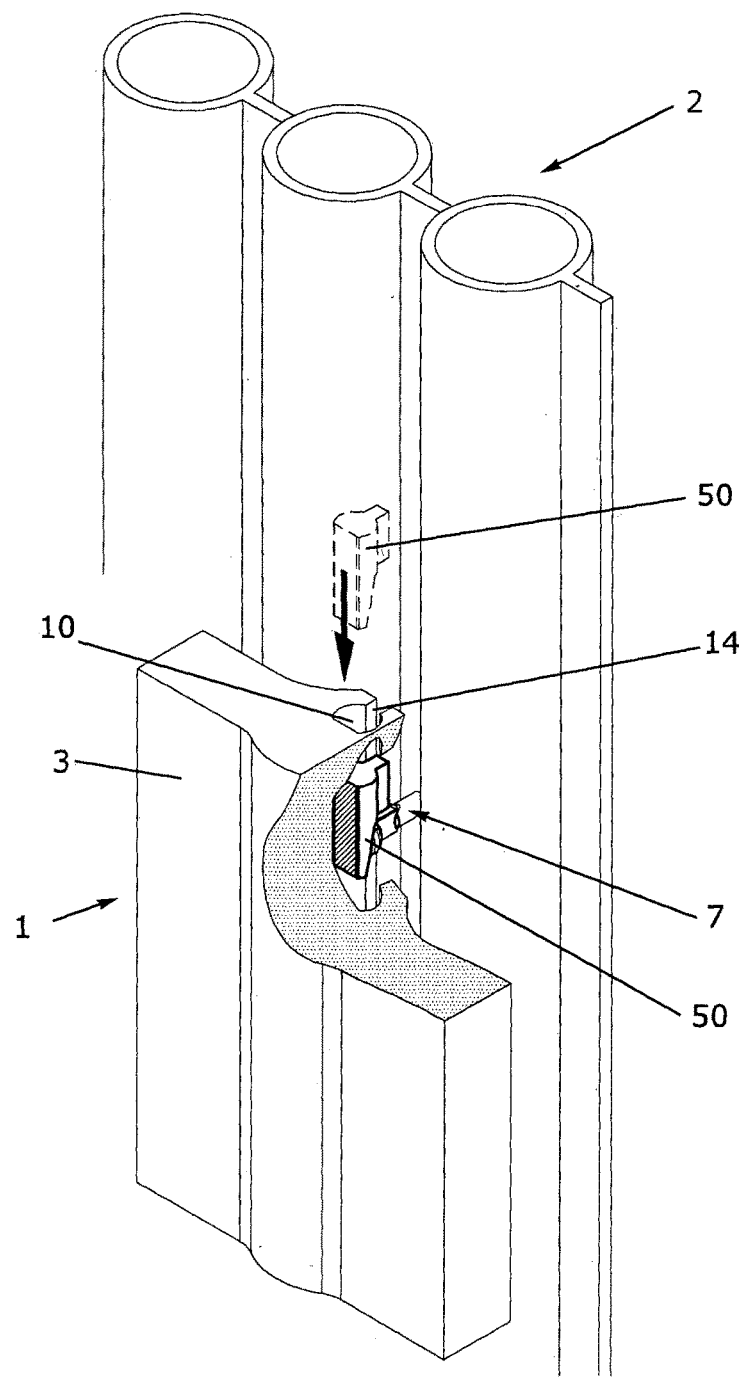
Figures 7A, 7B:
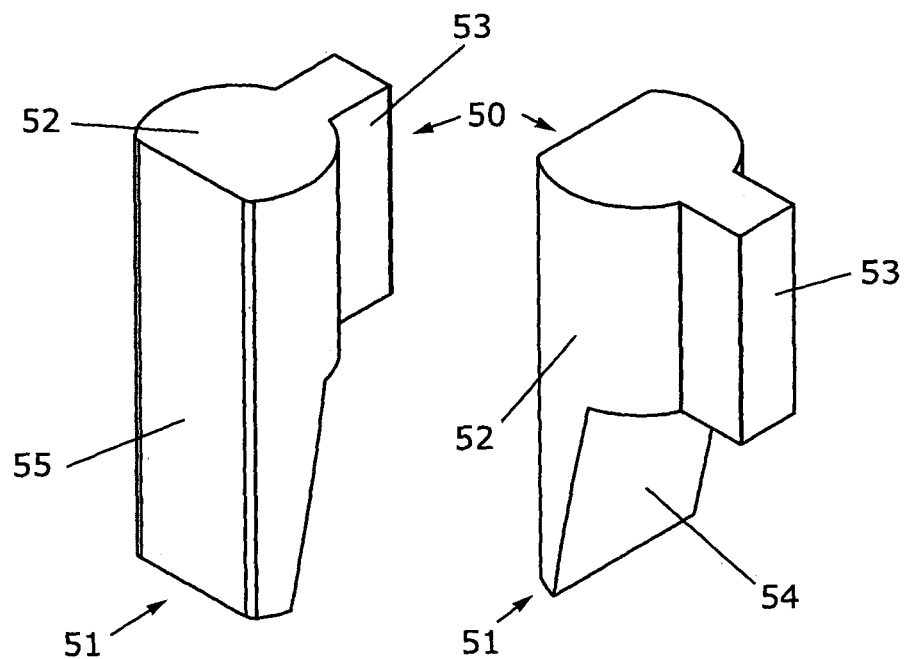
Figures 7C, 7D:
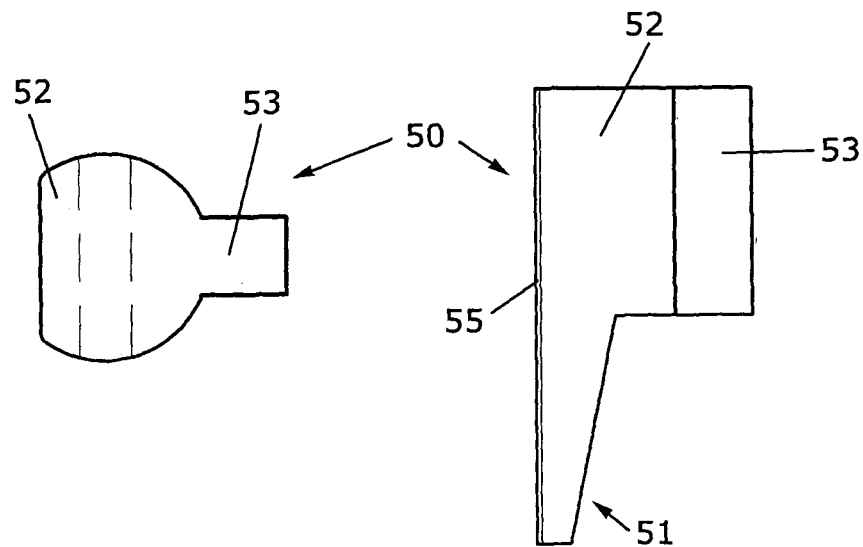
Figure 8A:
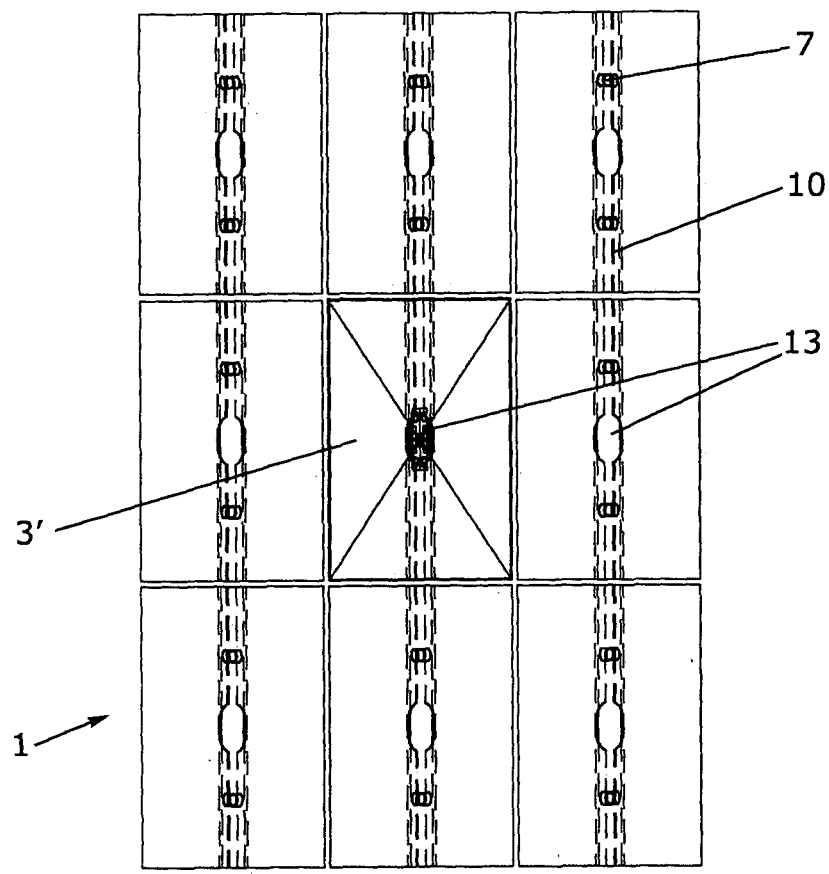
Figure 8B:
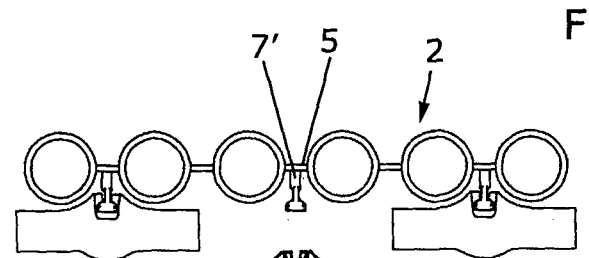
Figure 8C:
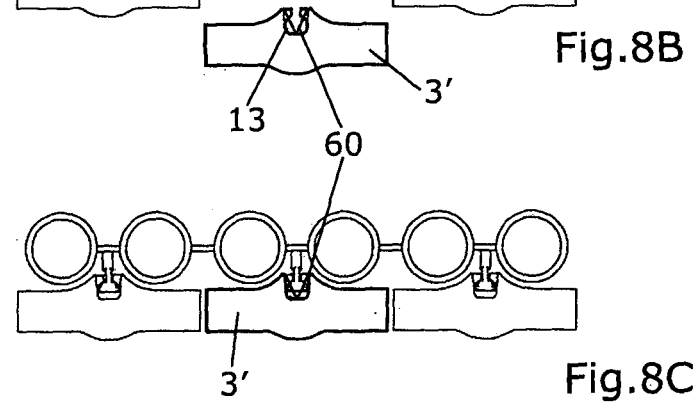
Figure 9A:
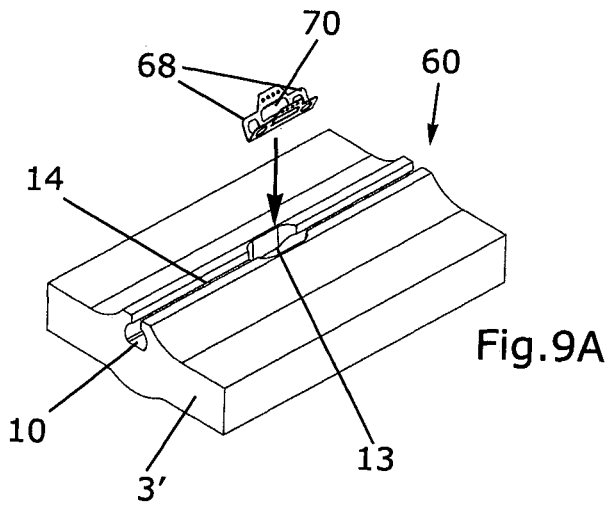
Figure 9B:
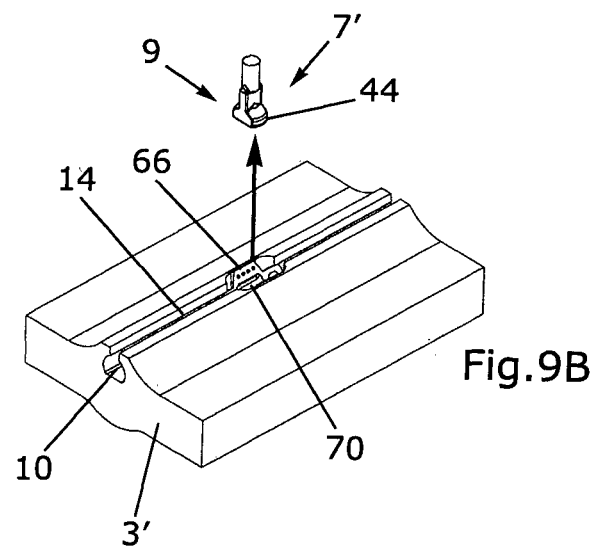
Figure 9C:
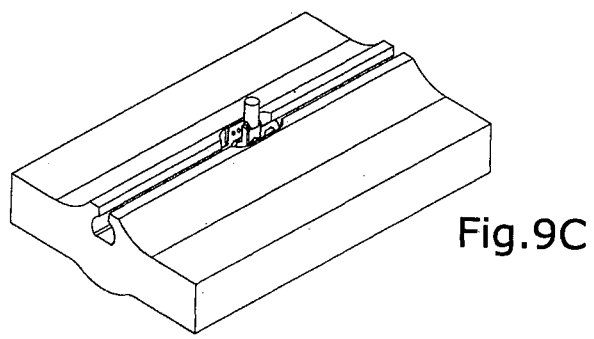

FIG. 5B—5C shows in top and side view, respectively, the head bolt of FIG. 5A;

FIG. 6 shows in an isometric view the use of a wedge element in the insertion channel of a tile;

FIG. 7A—7B shows, in isometric front and side view, the wedge element of FIG. 6;

FIG. 7C—7D illustrates in top and side view the wedge element of FIGS. 7A-7B;

FIG. 8A-8C shows in front and top view the use of a repair tile according to the invention;

FIG. 9A-9C shows in isometric side view the use of a clip-element in a tile;

FIG. 10A-10E shows in isometric, top and side view in more detail the clip-element of FIG. 9A.

Figure 1A:
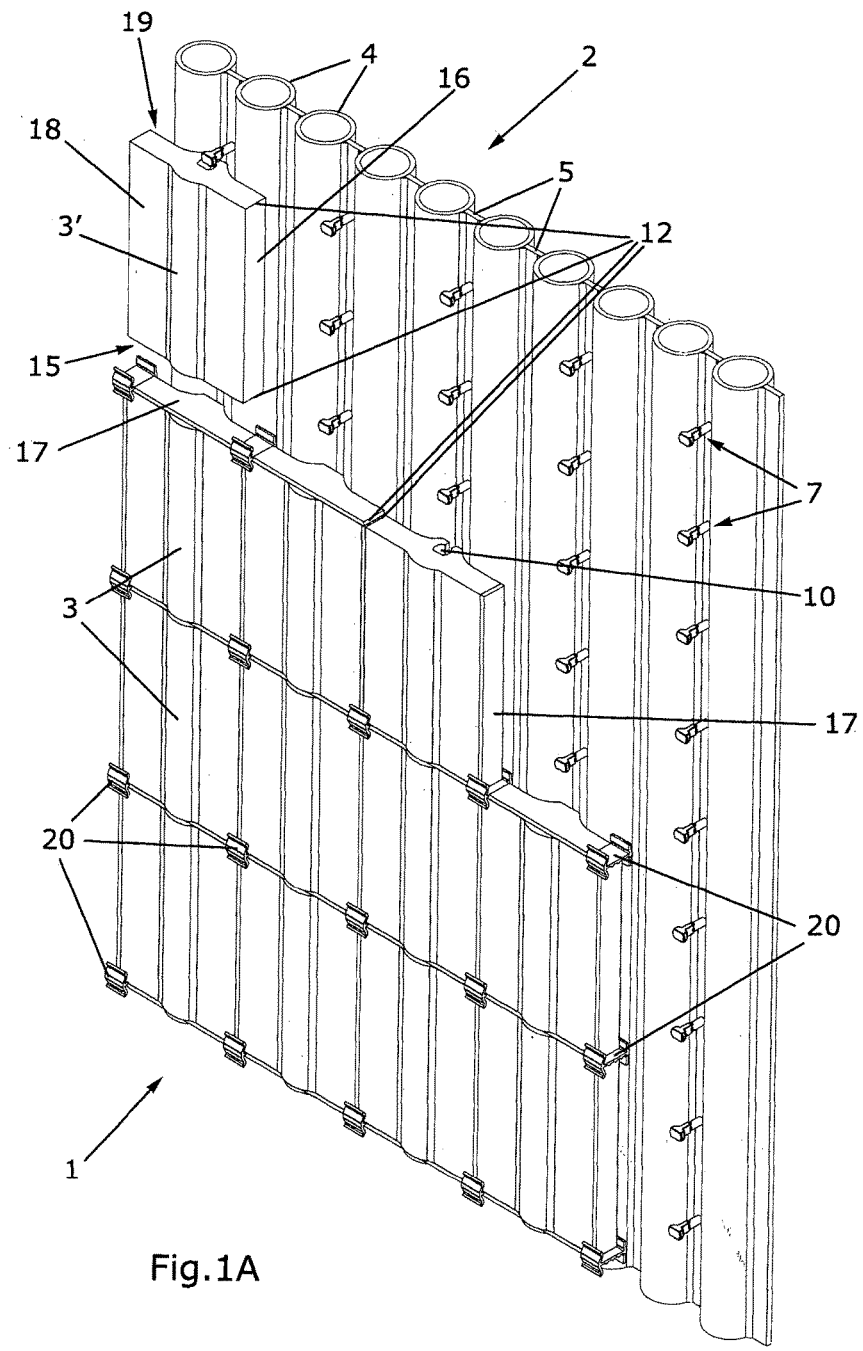
FIG. 1A shows in an isometric view a tube wall with a refractory lining of tiles according to the invention, with tile spacers between the width edges of the tiles.
Figure 1B:
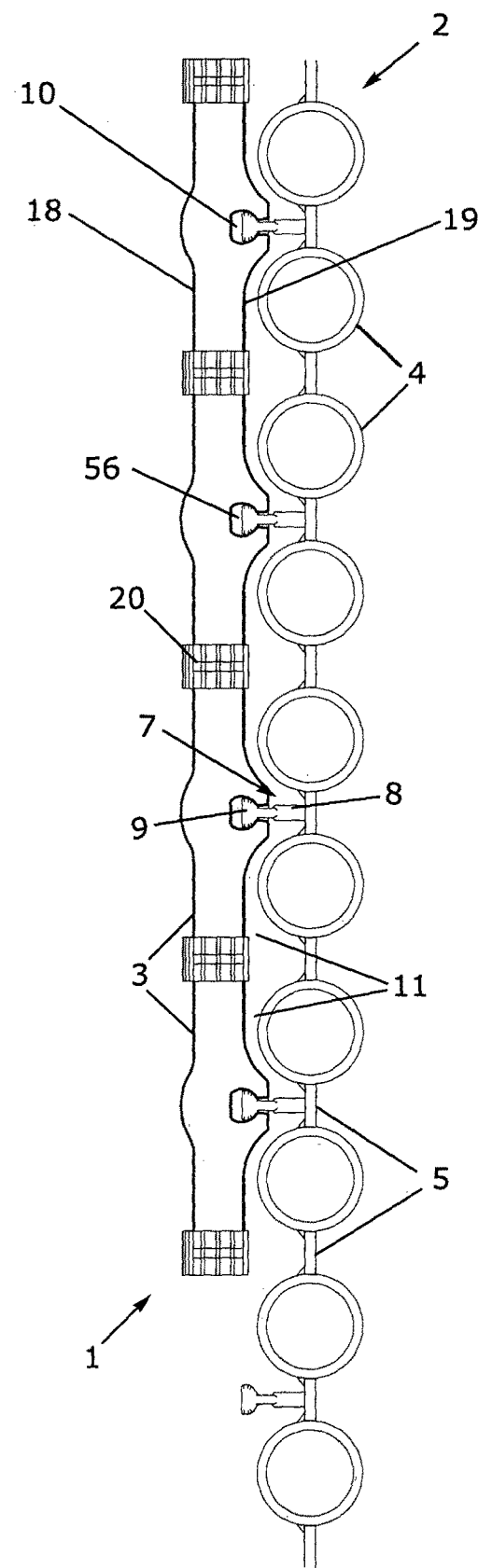
FIG. 1B shows, in a top cross-sectional view of FIG. 1A, the tube wall with the refractory tiles.

FIGS. 1A-1B show an embodiment of the refractory lining 1 of a tube wall 2 for an incinerator according to the invention. The tube wall comprises a plurality of parallel tubes 4, which are interconnected by means of fins or connecting strips/dams 5, so that a closed wall is formed. During use of the incinerator, a medium or fluid flows through the tubes, which medium is suitable for absorbing heat from the incinerator. As medium usually water and/or steam are applied. The lining 1 is formed by a number of adjacent and superposed refractory tiles 3 of ceramic material, which at the rear—the tube wall-side 19, which is facing towards tube wall 2—are provided with a vertical insertion channel 10. The front side of the tile—the furnace fireside 18—faces towards the interior of the incinerator. The connecting strips 5 are provided with tile holders 7, onto which the tiles 3 are suspended (hanged), or with which the tiles are mounted onto the tube wall 2. In this embodiment the holders 7 are provided with a head 9 and with an anchor 8, with which the holder 7 is welded, for example by stud welding, onto the connecting strips 5 between the tubes 4. In attached position, the holders 7 are substantially perpendicular oriented with respect to the tube wall 2. Preferably a screw head or nut is used for the head 9, or a fixed head is formed so that the holder is a so-called one-piece head bolt.

Figure 2A:
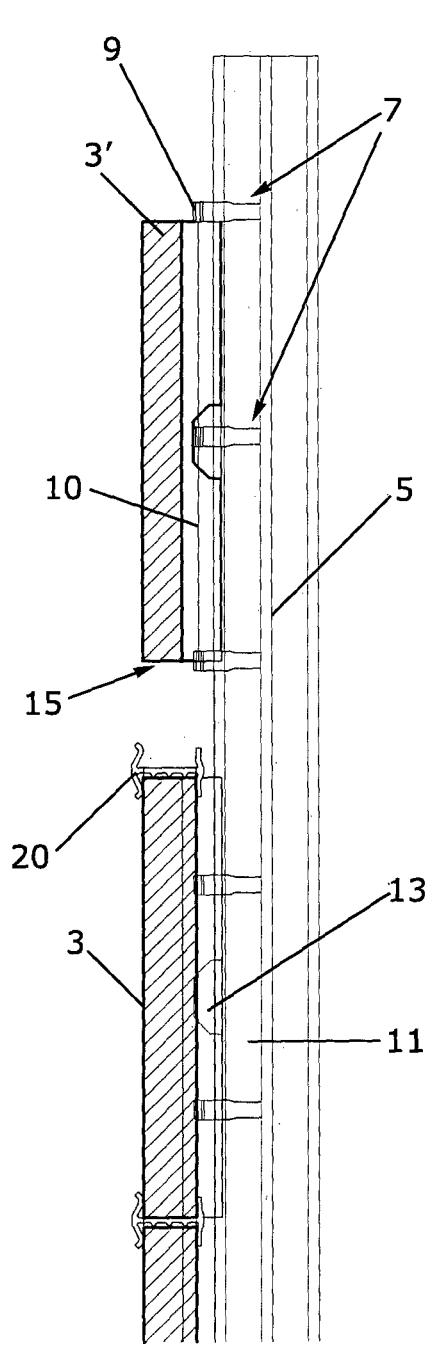
FIG. 2A shows in a side through-view pushing of the tiles onto the holders, and the use of a spacer.
Figure 2B:
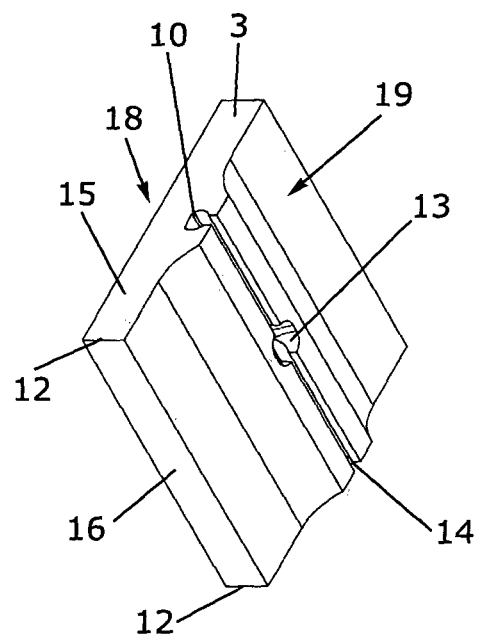
FIG. 2B shows in more detail a refractory tile for use in the lining according to the invention.

Furthermore, FIG. 2B shows in more detail the rear side—the tube wall-side 19—of a refractory tile 3 with insertion channel 10. In FIG. 2A there is shown that the tile 3 with its insertion channel 10 is pushed onto the holder 7, in particular, onto the head 9. The insertion channel 10 over its entire length is provided on its rear side—the tube wall-side 19—with a narrow open connecting slot 14, enabling the anchor 8 of the holder 7 to pass through. Furthermore in the shown embodiment, the tile is provided with an (optional) insertion hole 13, which is wide enough to allow the head of a holder to be inserted and to pass through, so that by means of this insertion hole 13 the holder 7 is received into the insertion channel 10, and the anchor 8 is received into the connecting slot 14. In the embodiment of FIG. 2A, the tile 3 is mounted on two holders 7. The insertion hole 13 may be provided "prefabricated" during the manufacture of the tile, but may also be provided later, for example, by drilling or milling at the construction site during building up of the refractory lining.

In FIGS. 1A and 2A is shown how tile 3' is shifted or pushed or moved onto the two holders 7 and is positioned on an underlying tile 3. Joint material 17, such as a strip of felt, may be fitted and/or adhered between the tiles, like the shown horizontal joint material between the underside face 15 of the upper tile 3' and the topside face of the lower tile 3. Moreover, vertical joint material 17 is provided between the adjacent vertical side faces 16 of the tiles. The joint material 17 prevents the pouring compound flowing into the joints between the tiles and thereby hampering the thermal expansion of the tiles during operation and thus giving rise to a sharp increase of cracking of the tiles.

FIG. 1B shows the free space 11 between the tiles 3 and the tube wall 2, which space is filled with a curable pouring compound, such as liquid concrete mortar. Preferably this pouring compound must be present anywhere between the metal parts—tube wall and holders—and the refractory tile in order to avoid contact during operation between the corrosive exhaust gases of the furnace and the metal parts. In order to maximize the heat transmission through the refractory lining, the thickness of the free space and consequently of the cured pouring material, must be as small as possible. However, a too thin free space between the tiles and the tube wall will affect the pouring process of the pouring compound, so that inhomogeneities will arise in the cured poured layer, possibly forming void zones in the free space where no poured layer is present. As a result of these voids, the risk of damaging the tube wall by the corrosive flue gases is greatly increased.

Furthermore FIGS. 1A-2A show the (lining) tile spacers 20 according to the invention. The spacers 20 are provided adjacent to the adjoining thickness edges 12 (see also FIG. 2B) of four refractory tiles 3, which are arranged in a square bond (relationship), stacked two by two next to one another. Applying these spacers 20 enables a quick and efficient alignment of the tiles 3 of the lining, horizontally as well as vertically. Additionally, these spacers 20 prevent that the joint material, such as felt, is pressed out (ejected) from the joints between the tiles by the hydrostatic pressure of the pouring compound. When the pouring compound is located in the joints, the tiles are allowed very little expansion or non at all, thereby increasing the risk of cracking and/or breaking of the tiles, and even of falling out of the tiles from the lining. The spacers 20 also prevent shifting and mutual displacement of the tiles, and of the tiles on the holders, due to the hydrostatic pressure during filling of the rear pouring joint with the pouring compound.

Figure 2C:
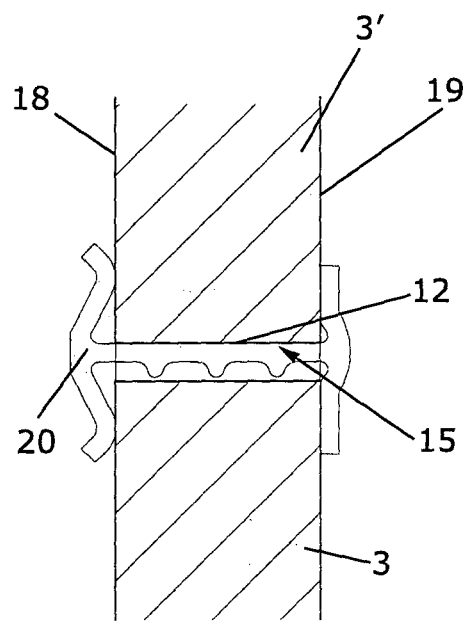
FIG. 2C shows in more detail in cross-sectional view the spacer between the two superposed tiles of FIG. 2A.
Figure 4:
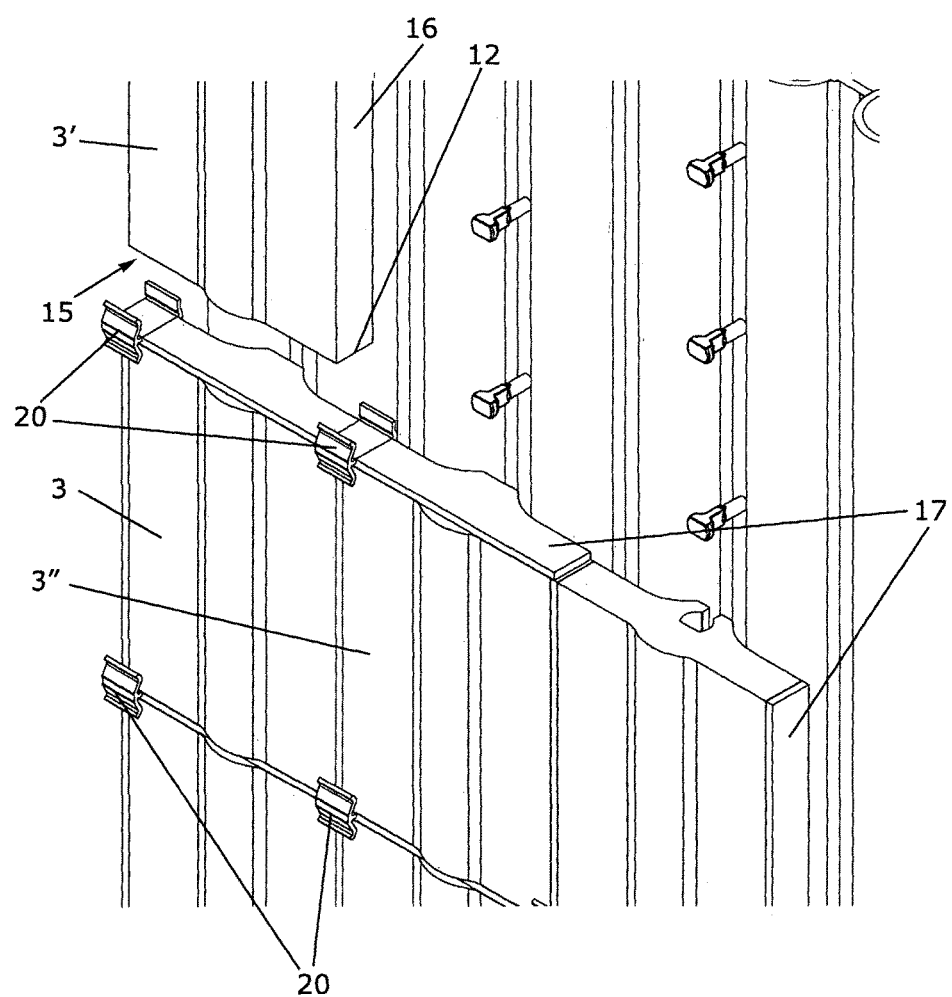
FIG. 4 shows in more detail in isometric view a number of tiles with spacers according to the invention.

In FIG. 2C together with FIG. 4 there are shown the tile spacers 20 supporting at least one side face 15 of the adjoining thickness edge 12 of a superposed tile 3'. In FIG. 2C, this supported side face 15 is the underside face of the upper tile 3', which face contains edge 12. In FIG. 4, a preferred embodiment of the refractory tube wall lining is shown, wherein each spacer 20 supports two (under-)side faces 15 of two side by side arranged tiles 3, 3". The spacers are now located above the vertical joints between the tiles, and are therefore in contact with four different tiles, which are arranged in a non-overlapping relationship in pairs above and next to each other. As a result, at each corner of each tile a thickness edge extends parallel to the thickness edges of each of the three adjacent tiles.

Figure 3A:
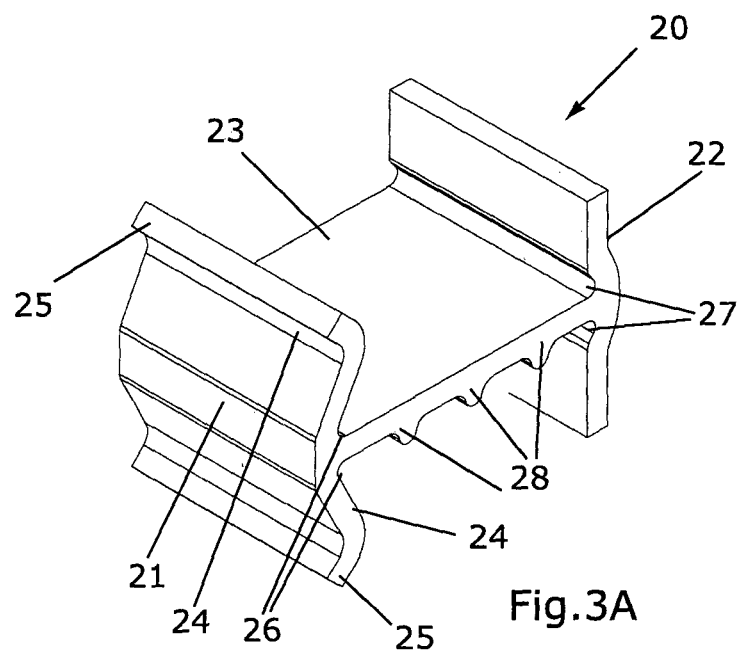
FIG. 3A shows in more detail in isometric view the tile spacer according to the invention.
Figure 3B:
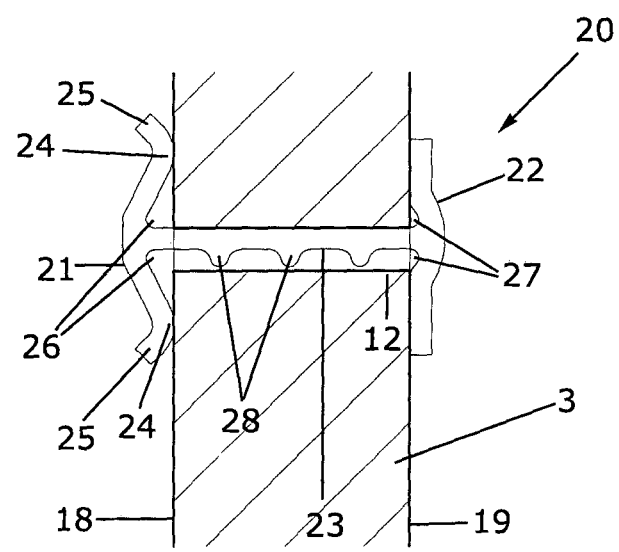
FIG. 3B shows in cross-sectional view the spacer of FIG. 3A between two tiles.

In FIGS. 3A and 3B an embodiment of a spacer 20 according to the invention is shown in more detail. The spacer 20 is provided with an H- or I-shape and comprises flanges 21, 22 at both ends of the body 23. The upper fireside flange 21 is provided with a clamping rim 24, formed by an inwardly horizontally curved or folded portion of the flange 21. The lower fireside flange 21 is also provided with a clamping rim 24, formed by a horizontally inwardly curved or folded portion of the flange 21. As shown in FIG. 3B, this allows the spacer 20 to be clamped upon the topside face of a tile 3, including edge 12, wherein the fireside flange 21 and the tube wall flange 22 both extend over the furnace fireside 18 and the tube wall-side 19 respectively of the tile 3. On its underside the body 23 is provided with three parallel ribs 28, so that the desired and required uniform joint height between the tiles is obtained, and moreover shifting or moving is prevented of the horizontal joint material 17 (felt) between the tiles.

Essentially, the tube wall flanges 22 are extending flat along the tube wall-side 19 of the tiles, and at a right angles with respect to the body, so that the tile lining on the tube wall-side is very flat and level, and that the pouring compound is able to easily flow along the surface of the tube wall-side 19 of the tile 3, and to form a good homogeneous mortar layer between the refractory tiles and the tube wall.

The clamping edges 24 ensure that the tile(s) remain firmly fixed and that the tolerance in the thickness of the tile is compensated mainly at the furnace fireside 18, so that the tube wall-side 19 of the lining is as flat and even as possible. The end of the fireside flange 21, preferably at both ends, is provided with an outwardly bent or curved portion 25. This curved portion 25 extends substantially horizontally (in parallel) to the body 23 of the spacer. Through these measures, the tiles are easily positioned and firmly clamped onto the spacer 20 from above.

When building up the liner, the following steps can be distinguished: (see FIG. 1A) attaching a plurality of holders 7 on the connecting strips 5 between the tubes 4 of the tube wall 2; subsequently mounting of a plurality of refractory tiles 3 next to each other in a first horizontal row by pushing them from top to bottom with their vertical insertion channels onto the holders 7;

providing vertical strips of felt 17 on the upper side faces of the mounted tiles, subsequent positioning of tile spacers 20 near two mutually adjoining edges 12 of two adjacent refractory tiles 3 in the first row;

subsequently positioning of a second horizontal row of tiles upon the first horizontal row of tiles by pushing the tiles from top to bottom with their vertical insertion channel upon the holders 7, in such a way that the spacer 20 is provided closely adjacent to four mutually adjoining edges 12 of four refractory tiles 3. When two to four rows of tiles are stacked on top of each other: applying the pouring mortar into the free space 11 between the tiles 3 and the membrane wall 2.

Moreover, it has been found that assembling the refractory lining according to this method enables building up of the lining more quickly and easily, and furthermore results in a longer service life and lifespan and less likely results in damage or leakage of the tube wall than with the known lining methods.

Preferably, the spacers are manufactured from a plastic material such as polyethylene or polypropylene. Consequently, the spacers are so-called lost material, because the used plastic material burns already at low temperatures during start-up of the furnace. By providing the spacers with fibreglass reinforcement, the rigidity of the spacers is increased, and furthermore the fibreglass remains present in the joint near the felt, thereby during operation hampering direct contact between the hot furnace gases and the free space filled with mortar.

Preferably, the dimensions of the spacer are approximately 25×35×25 mm length×width×height in the mounted position of FIG. 1A, at a thickness of about 2.5 mm. In an advantageous embodiment, the spacer is provided with slots 26, 27 in order to be able to receive burrs in the tiles. Preferably, these slots extend over the inner edges between the body 23 and the flanges 21, 22 of the spacer 20.

FIGS. 5A-5C show a special embodiment of the holder 7, shaped as a one-piece head bolt. The head bolt is provided with a head 9 with flattened side faces 40 and topside 43. Furthermore, the head is provided with rounded undersides 42 and a narrowed neck section 41 between the head and the smooth-surface anchor 8. The rounded circular shape of the underside of the head provides a larger contact area with the rounded inner side of the insertion channel (also referred to as tile channel) of the tile with respect to the known planar nuts, so that notching is prevented by line/point contact of the flat head or nut with the inside of the insertion channel caused by the (hydrostatic) load during the assembly, or by deformation of the tiles during operation.

The narrowed neck section 41 allows for easier mounting of the tiles because more freedom is available in the horizontal direction during—in vertical direction—moving of the tiles with their insertion channel 10 and their connecting slot 14 on the holders 7.

A smooth-surface anchor 8 has the advantage, that it is 40% stronger than a threaded rod of the same diameter; additionally a smooth-surface anchor is better resistant to chemical attack owing to the smaller specific surface area. By providing the neck section and the anchor with a substantially equal cross-sectional area, a bolt is obtained allowing easy positioning of the tile, but without comprising weakened portions or sections.

FIG. 6 shows an alternative embodiment of the refractory lining 1 of a tube wall 2 for an incinerator according to the invention. In this embodiment, the refractory lining 1 is provided with a wedge element 50, which is pushed downwards from the top into the insertion channel 10 of the tile 3, after the tile 3 with its insertion channel 10 and its connecting slot 14 is pushed onto the holder 7. In this embodiment shown, the holder 7 is a one-piece head bolt with a head 9 having flattened side faces 40 and a flattened top 43, as hereinbefore described and shown in FIG. 5A-5C.

By inserting the tapered wedge portion 51 of the wedge element 50 into the space 56 (see FIG. 1B) between the topside 43 of the holder 7 (head bolt) and the inside of the insertion channel 10, the (rounded) undersides 42 of the holder 7 are pressed against the rounded inside of the insertion channel 10, so that the tiles are optimally positioned at the desired distance from the tube wall 2.

FIG. 7A-7B show in more detail a preferred embodiment of the wedge element 50. The wedge element 50 includes a channel body 52, which is adapted to be able to be received and to be moved within the insertion channel of the tiles. A front face 55 that extends over the entire channel body, including the wedge portion 51, forms the front side of the wedge element 50. At the rear side of the channel body 52 a slot body 53 is provided, which is adapted to extend into, and to be able to move through, the narrow connecting slot 14 of the tiles 3. The lower part of the channel body 52 constitutes the wedge portion 51. This wedge portion 51 includes a sloping surface 54 that, seen from the top starting approximately in the vicinity of the slot body 53, tapers to the bottom of the front face 55. Due to this features, the wedge element 50 is always in the correct manner inserted (except when it is inserted upside down) into the insertion channel, and the wedge portion 51 is readily inserted into the space 56 between the head 9 of the head bolt and the inside of the insertion channel 10. Preferably, the wedge element is made of a heat resistant material such as a ceramic material that in composition corresponds to the pouring compound. For the ceramic material well-known compositions are used including compositions with 60% SiC concrete by weight.

In FIG. 8A there is shown an alternate embodiment of the refractory lining 1 of a tube wall for an incinerator according to the invention. In this embodiment the refractory lining 1 is provided with a repair tile 3'. The repair tile 3' is provided with an insertion hole 13, preferably in the insertion channel 10. This tile 3' is used when a new lining part must be fitted into an existing lining part, or when a tile must be replaced. Because now it is not possible to push the tile from top to bottom with its insertion channel 10 onto the holders 7, the repair tile 3' is mounted onto the (tile) holder 7 by means of a clip- or snap-element 60, arranged in the insertion hole 13. In the embodiment shown in FIG. 8A, the original two tile holders 7 are removed and a new tile holder 7' is attached onto a connection strip 5 of the tube wall 2 at a new position, nearby the position of the "prefab" insertion hole 13 of the tile (see FIG. 8B-8C). If desired, the insertion holes 13 may also be provided and sized into the tile at the construction site during building up the refractory lining, for example by drilling. By means of applying the clip-element, the tile is optimally positioned at the desired (equal) distance from the tube wall, thereby obtaining a uniform horizontal and vertical alignment with the adjacent tiles.

The repair tile 3' may be provided with a filling opening having the shape of a full- or semi-circular filling opening, so that curable pouring compound is easily inserted into the space between the tile (s) and the tube wall.

In FIG. 8B-8C is shown how the tile 3' is snapped onto the tile holder 7' by means of the clip-element 60 provided in the insertion hole 13. After inserting the tile holder 7' into the clip-element 60, the clip-element is locked into the insertion channel 10, because the distance between the hook-tabs 68 of the clip-wings 62 is greater than the width of the connecting slot 14 of the tile 3, 3'.

FIG. 9A-9C show in more detail in isometric views the application of the repair tile 3'. In FIG. 9A, the V-shaped clip-element 60 is inserted through connecting slot 14 into the insertion channel 10 and into the insertion hole 13. In FIG. 9B, the clip-element 60 is positioned into the insertion channel 10 of the repair tile 3'; the support-tabs 66 are located within the insertion hole 13, and the hook-tabs 68 (not visible) are located behind the connecting slot 14. In FIG. 9B, the tile holder 7' is provided with insertion portions 44, such as the head 9 of a head bolt of FIGS. 5A-5C. The insertion portions 44 are received into the openings 70 in the clip-wings, so that the clip-wings and the hook-tabs can no longer move towards each other, and the clip-element is locked securely into the insertion channel 10. The insertion portions 44 of the head bolt-holder 7' are fixedly locked into the openings 70 of the clip-element, so that the tile 3' is firmly latched upon the holder 7'.

Figures 10A, 10B:
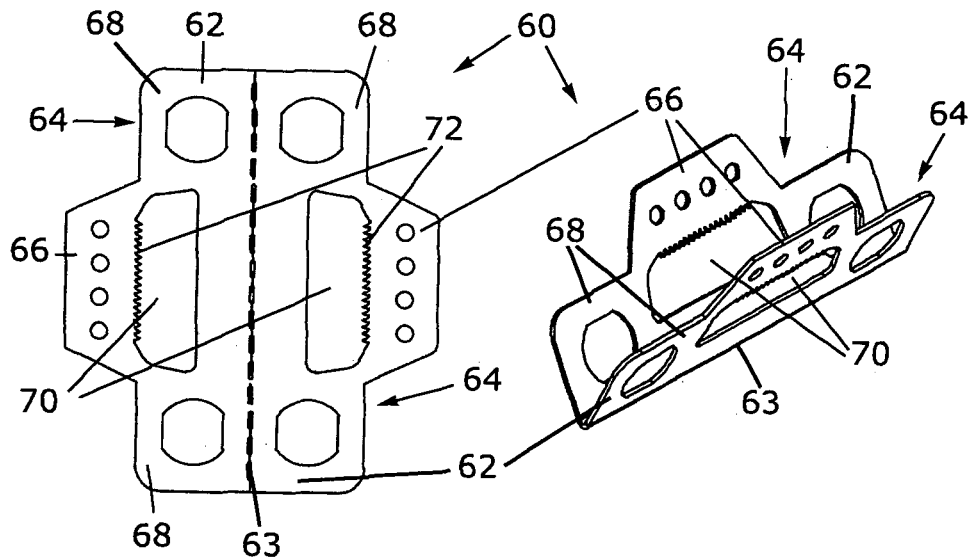

FIGS. 10A and 10B show the enlarged clip-element 60 according to the present invention, 10A is a top view and 10B is an isometric view. The clip element 60 comprises two clip-wings 62, interconnected at their base side 63. In this embodiment, the clip-wings 62 are folded relative to each other into a V-shaped element around the base or fold line 63. At their topsides 64, the clip-wings are provided with a support-tab 66 and with a hook-tab 68. The two clip-wings 61, 62 are provided with openings 70 for receiving, clamping and locking the insertion portions 44 of a (tile) holder 7, 7'. In this embodiment, the openings 70 of the clip-wings are provided with engagement means 72 for the insertion portions 44 of the holder. In this embodiment, the engagement means 72 are formed as a serrated edge with teeth at the upper side of the opening 70 for extra tolerance and grip, thereby restricting shifting or moving of the insertion portions 44 of the tile holder 7.

Figures 10C, 10D, 10E:
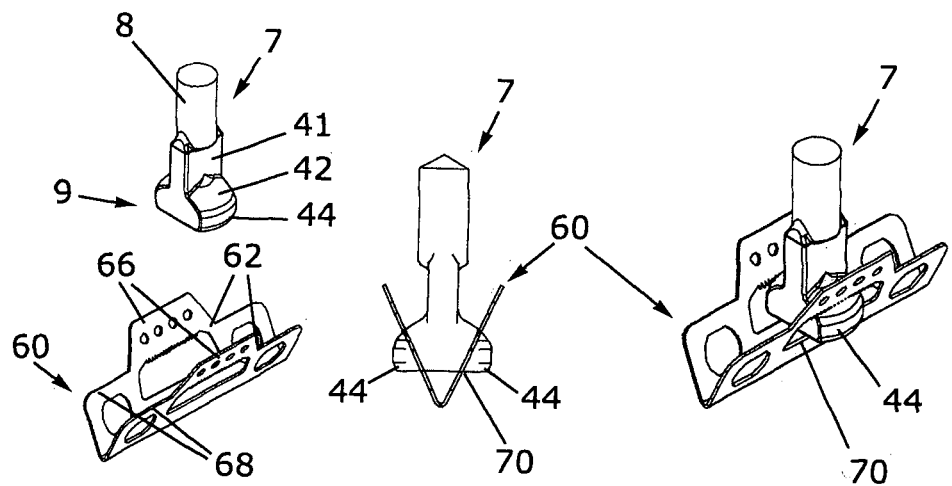

In FIG. 10C-10E in two isometric views (10C-10E) and a side view (10D), snap-fitting of the tile holder is shown in detail. In this embodiment, the tile holder 7 is a head bolt according to FIG. 5A-5C, provided with rounded undersides 42, and with a narrowed neck section 41 between the head 9 and the smooth-surface anchor 8. When snapping the clip-element 60 onto the tile holder 7, firstly the support-tabs 66 contact the insertion portions 44 of the head 9 of the holder 7. Consequently, the head 9 presses the support-tabs 66 and thus the clip-wings 62 further away from each other, so that the hook-tabs 68 are moved out of the zone of the connecting slot 14, so that the hook-tabs fixedly hook the clip-element 60 into the insertion channel 10 of the tile 3. When the insertion portions 44 of the head 9 of the holder 7 have passed the support-tabs 66 of the clip-element 60, the insertion portions 44 are received into the openings 70 in the clip-wings 62 and are thereby snapped and locked in place in the clip-element 60 (FIG. 10D-10E). In FIG. 10D-10E is shown that the insertion portions 44 protrude out of the openings 70 within the clip-wings, and as a result are inseparable connected to the V-shaped clip-element 60.

Preferably, the (unfolded, flat) clip element has dimensions of approximately 50×45 mm with a thickness of about 0.8 mm and is made of a refractory metal including stainless steel (AIST 309/310).

The invention claimed is:

1. Refractory lining of a tube wall (2) for an incinerator, comprising:
   at least four refractory tiles (3) of ceramic material, which are arranged next to and above one another, wherein the refractory tiles at their tube wall-side, which is facing the tube wall (2), are provided with a vertical insertion channel (10), and wherein an edge (12) of each of the four refractory tiles adjoins an edge of each of the three other refractory tiles;
   a holder (7) for each refractory tile (3), the holder is provided with an anchor (8) attached to the tube wall (2), and in mounted position of the refractory lining, the holder extends substantially perpendicular to the tube wall (2) and partially extends into the insertion channel (10),
   and wherein a free space (11) is formed between the refractory tiles (3) and the tube wall (2),
   at least one spacer (20) is provided adjacent to the four mutually adjoining edges (12) of the at least four refractory tiles (3); and
   wherein the at least one spacer is provided adjacent to the four mutually adjoining edges (12) of the at least four refractory tiles (13), and wherein the at least one spacer supports two faces (15) of two next to one another arranged refractory tiles, and wherein a supported face of each supported refractory tile comprises the edge (12) which adjoins an edge of each of the other three refractory tiles.

2. Refractory lining according to claim 1, wherein of each refractory tile two faces (15, 16) are provided with a strip of felt (17), on an upper side face and a right-hand or left-hand side face of the refractory tiles.

3. Refractory lining according to claim 1, wherein the at least one spacer has an I-shape with flanges (21, 22) at both ends of a body (23).

4. Refractory lining according to claim 3, wherein the flanges (21, 22) of the at least one spacer extend over a furnace fireside (18) and over a tube wall-side (19) of two refractory tiles arranged above one another.

5. Refractory lining according to claim 3, wherein the flanges of the at least one spacer extend over a furnace fireside (18) and over a tube wall-side (19) of the four refractory tiles, arranged next to and above one another.

6. Refractory lining according to claim 3, wherein the at least one spacer is provided with fireside flanges (21) for a furnace fireside (18) of the refractory tile, and of tube-side flanges (22) for a tube wall-side (19) of the refractory tile, in which the tube-side flanges extend substantially planar and at right angles with respect to the body (23).

7. Refractory lining according to claim 6, wherein an outer end of the fireside flange (21) is provided with an outwardly bent or curved portion (25).

8. Refractory lining according to claim 3, wherein at least a fireside flange (21) of the at least one spacer is provided with a clamping rim (24).

9. Refractory lining according to claim 8, wherein the clamping rim (24) is formed, in a direction of a tube-side flange (22), by an inwardly bent or curved portion of the fireside flange (21).

10. Refractory lining according to claim 3, wherein the body (23) of the at least one spacer at one side is provided with at least one rib (28), which extends parallel to the flanges.

11. Refractory lining according to claim 10, wherein two or more parallel ribs (28) are provided on the body (23).

12. Refractory lining according to claim 1, wherein the at least one spacer is selected from the group consisting of a material that disappears, burns or evaporates during operation of the incinerator, and of a material selected from the group consisting of plastic or synthetic resin; or glass fibre reinforcement.

13. Refractory lining according to claim 1, wherein the holder is a one-piece head bolt, which comprises an anchor (8) and a fixed head (9).

14. Refractory lining according to claim 13, wherein for the features of the head bolt one or more are selected from the group consisting of: a head (9) with flattened sides (40); a head with rounded undersides (42); a narrowed neck section (41) between the head and the anchor; a smooth-surface anchor (8); or the area of the cross-section of the anchor (8) is substantially equal to the area of the cross-section of the neck section (41).

15. Refractory lining according to claim 1, wherein a wedge element (50) is provided in the insertion channel (10) adjoining the holder (7), wherein the wedge element is adapted to optimal position the refractory tiles (3) onto the holder.

16. Refractory lining according to claim 15, wherein the wedge element comprises a channel body (52), provided with a wedge portion (51) and a slot body (53).

17. Refractory lining according to claim 1, wherein an insertion hole (13) is provided in a refractory tile (3), a clip-element (60) is provided in the insertion hole (13), and the refractory tile (3) with the clip-element is snapped onto the holder (7).

18. Refractory lining according to claim 17, wherein the clip-element (60) is a V-shaped snap-element, which comprises two clip-wings (62), which at a base side (63) are interconnected and which at upper sides (64) are provided with a support-tab (66) and with a hook-tab (68).

19. Refractory lining according to claim 18, wherein the two clip-wings (62) of the clip-element (60) are provided with openings (70) adapted for receiving and clamping of insertion portions (44) of the holder (7).

20. Refractory lining according to claim 19, wherein the openings (70) in the clip-wings (62) of the clip-element (60) are provided with engagement means (72) such as teeth.

21. Method for assembling and building up a refractory tube wall lining for an incinerator, said method comprising the steps of:
attaching a plurality of holders (7) on connecting strips (5) between the tubes (4) of the tube wall (2);
mounting of a plurality of refractory tiles (3) next to one another in a first horizontal row with their vertical insertion channels (10) on the holders;
providing at least one spacer (20) adjacent to two mutually adjoining edges (12) of two next to one another refractory tiles (3) in the first row; and
mounting of a second horizontal row of refractory tiles upon the first horizontal row of refractory tiles, such that the at least one spacer (20) is positioned adjacent to four mutually adjoining edges (12) of four refractory tiles (3)
providing at least one spacer adjacent to the four mutually adjoining edges (12) of the at least four refractory tiles (13), the at least one spacer supports two faces (15) of the two next to one another arranged tiles, and wherein the supported face of each supported refractory tile comprises the edge (12), which adjoins an edge of each of the other three tiles.

* * * * *